Oct. 6, 1964 P. BALTENSPERGER ETAL 3,152,282

SHORT-CIRCUIT LIMITING DEVICE

Filed Oct. 26, 1961 4 Sheets-Sheet 1

INVENTORS
Paul Baltensperger
Josip Dobsa
Hans Hartmann
Adolf Eidinger
BY Pierce, Schiffler & Parker
ATTORNEYS

SHORT-CIRCUIT LIMITING DEVICE

Filed Oct. 26, 1961 4 Sheets-Sheet 2

INVENTORS
Paul Baltensperger
Josip Dobsa
Hans Hartmann
Adolf Eidinger
BY Pierce, Scheffler & Parker
ATTORNEYS INVENTORS
Paul Baltensperger
Josip Dobsa
Hans Hartmann
Adolf Eidinger
BY Pierce, Scheffler & Parker
ATTORNEYS

SHORT-CIRCUIT LIMITING DEVICE

Filed Oct. 26, 1961 4 Sheets-Sheet 4

INVENTORS
Paul Baltensperger
Josip Dobsa
Hans Hartmann
Adolf Eidinger
By Pierce, Scheffler & Parker
ATTORNEYS 3,152,282
Patented Oct. 6, 1964

3,152,282

SHORT-CIRCUIT LIMITING DEVICE

Paul Baltensperger, Im Buch, Wurenlos, Aargau, Josip Dobsa, Wettingen, Aargau, Hans Hartmann, Ennetbaden, Aargau, and Adolf Eidinger, Nussbaumen, Switzerland, assignors to Aktiengesellschaft Brown, Boveri & Cie, Baden, Switzerland, a joint-stock company Filed Oct. 26, 1961, Ser. No. 147,861
Claims priority, application Switzerland Oct. 26, 1960
12 Claims. (Cl. 317—11)

Figure 1:
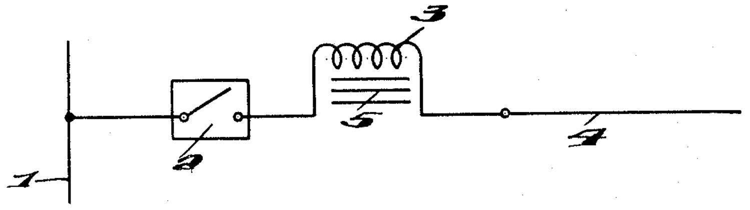

The present invention relates to a novel arrangement utilizing impedance coils with iron core to reduce the effect of short-circuits in electrical networks, particularly overhead transmission line networks, on the series connected heavy duty switch, and wherein it becomes possible to disconnect the contacts of the power interrupting switch at any time without regard to the instantaneous value of the short-circuit current.

It has been known for a long time to provide short-circuit choke coils in outgoing cables or lines. These limit the short-circuit circuit, since the mains impedance is increased. Particularly with faults in the immediate vicinity of the switch, this choke coil has a very great effect, because it is then a single impedance between the switch and the fault. These short-circuit choke coils have been wound up to now as air coils. They have a reactance which is at least of the order of magnitude of the impedances of the outgoing lines, very frequently even a higher reactance, particularly in cable networks. Because they are made without iron cores, they require a large number of turns and thus occupy much space in the switchgear plant. The requirements regarding the short-circuit strength are very high, since great dynamic forces appear during the short-circuit. The choke coils form by their high reactance with the still lower capacitance of the short-circuited line section a high characteristic frequency, according to which the returning voltage builds up. In this manner, a high rising velocity of the returning voltage is produced so that reignitions can occur during the disconnection in the power switch. This manifests itself particularly in distance short-circuits, i.e. in short circuits which are only a few kilometers away from the switching plants.

It has therefore been suggested to connect ohmic resistances parallel to the power switch which attenuate the oscillations. In addition, condensers were arranged between the line and the ground to increase the line capacity and thus to reduce the frequency of the returning voltage. These condensers must be designed for the full operating voltage and are therefore uneconomical.

The problem is therefore to find the least expensive device to facilitate the disconnection in the power switch in cases of distance short-circuits, that is, with high build-up frequencies of the returning voltage.

It is known to use choke coils in the switching of contact transformers which produce during the A.-C. cycle a low-current interval in the vicinity of the zero passage of the current during which the contacts of the transformer can switch. This is achieved by providing the choke coil with an iron core which is desaturated for a short time only during each half wave, but otherwise is so saturated that it can not cause any marked voltage drop. These choke coils can also be provided with auxiliary windings to be able to displace the time of the low-current interval at will. But these choke coils are not suitable for disconnection in cases of short-circuits. It is, therefore, necessary to provide additional short-circuiting devices in contact transformers which short-circuit the A.-C. side to protect the contacts and effect the disconnection by the A.-C. switch.

According to the invention, an impedance coil with iron core is utilized to reduce the effect of short-circuits in electrical networks, particularly overhead transmission line networks, the impedance coil being connected in series with the power switch in the line and becoming saturated at a value of about one-hundredth of the rated current of the switch, and the inductance of the impedance coil when de-saturated being not greater than a section of the overhead transmission line of about ten kilometers in length.

Various embodiments of the invention are represented in the attached drawings. FIG. 1 shows an overhead line branch in a switching plant. The overhead line 4 is fed from the bus bar 1 (represented as a single pole) over the power switch 2 and a choke coil with the iron core 5. Its inductance in the unsaturated state is at most as high as the inductance of an overhead line section having a length of 10 km. It is thus substantially smaller than in the known short-circuit choke coils. The method of operation of this device is as follows:

In normal operation, the impedance coil 3 functions in the same manner as a short-circuit choke coil of known design. An inductive voltage drop is produced which has practically no effect on the voltage because it is perpendicular to the voltage vector. But since the inductance is substantially lower than in the known choke coils, this voltage drop is even less significant. With respect to currents in the range near the zero passage point of the current, the iron core becomes saturated at instantaneous current values greater than one-hundredth of the rated current of the switch. Thus the voltage drop is further reduced even in normal operation. In the case of a short-circuit, the saturation exists over the entire cycle. During the zero passage of the current there is a short moment where the core is desaturated. The current is greatly reduced shortly before the zero passage point thereof. The current is also very small for a short time before and also after the zero passage point. A low-current interval thus exists, during which the disconnection in the switch is greatly facilitated since the arc can be extinguished in each A.-C. switch only in the zero passage. The contact points of the switch are thus more resistant to re-ignitions, even with a steeper returning voltage due to the presence of the choke coil. The deionization is much easier immediately before and during the zero passage, thanks to the flatter zero passage of the current. In addition, the coil takes over a considerable part of the voltage drop during the zero passage of the current for short-circuited circuits. Correspondingly, the respective instantaneous values of the returning voltage are reduced. This way it is possible to flatten the steepness of the returning voltage appearing on the switch.

Figure 2:
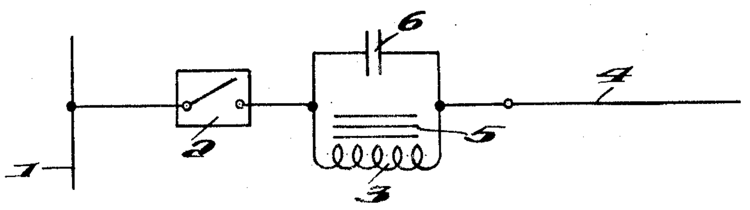

If the choke coil itself has a too high characteristic frequency, the latter can be reduced by the parallel connection of condensers or resistances. This arrangement is shown in FIG. 2 where the condenser 6 is provided in addition in parallel with the choke coil 3. The latter therefore need not be designed for the full voltage, but only for the voltage drop in the choke coil.

Figure 3:
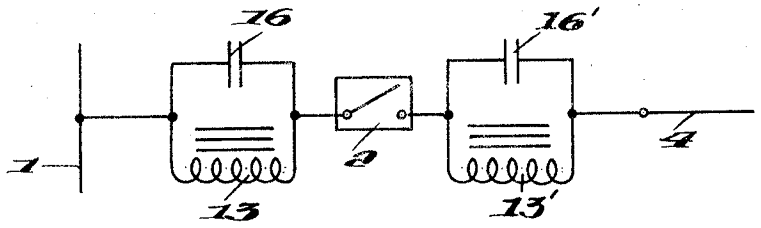

FIG. 3 shows an arrangement where choke coils are provided in the transmission line both before and after the switch 2. The choke coil 13 and a condenser 16 in parallel therewith are connected in the line 4 between switch 2 and the bus bar 1 of the central station. Similarly, choke coil 13' and paralleling condenser 16' are connected in the line 4 after switch 2. This arrangement is advantageous when the load switch 2 is connected with the bus bar 1 over longer overhead line sections such as for example several hundred meters or more in length.

Figure 4:
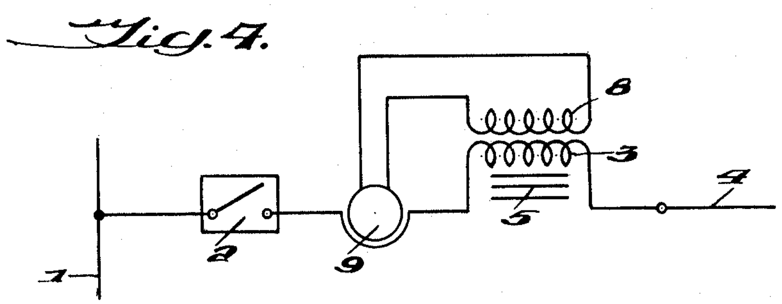

FIG. 4 shows a device where the saturation point of the choke coil can be influenced by premagnetization. It contains an auxiliary winding 8 which is connected to a current transformer 9. The characteristic inductance of the choke coil can thus be further reduced, since the saturation is achieved earlier at high currents by the auxiliary winding than if currents flowed only in the main winding.

Figure 5:
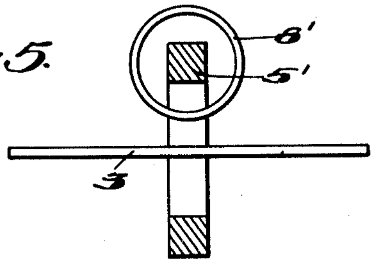
Figure 8:
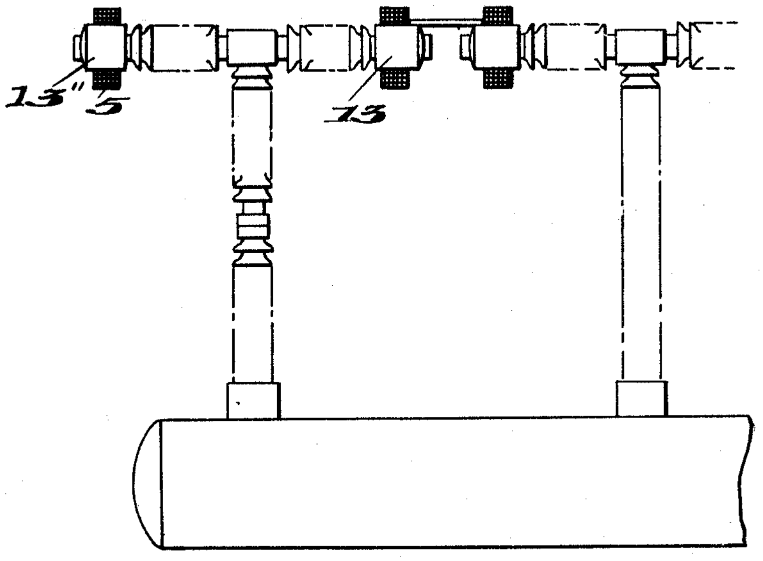

This measure is of particular importance when the choke coil possesses no winding of its own and the connection line for the load switch itself is used for this purpose to further reduce the cost of the device, an iron core being pushed over it. The auxiliary winding can be wound around the iron core. This is shown in FIG. 5. The conductor rod 3 replaces the choke winding of the previously described embodiments. The conductor 3 is surrounded by the iron core 5′ on which the auxiliary winding 8′ is wound. The iron core can be wound in known manner of iron strip about the conductor. As the rod conductor part around which the iron core 5′ is placed, one can use the metallic current lead-in part to the switch 2. In FIG. 8 these current lead-in parts are indicated by numeral 13″.

Figure 6:
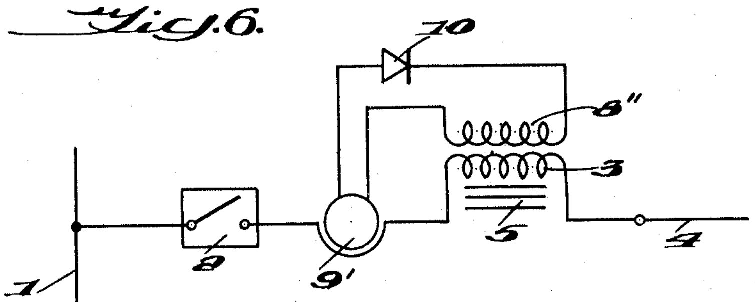

FIG. 6 shows an arrangement similar to FIG. 4 where the low-current interval can be displaced by D.-C. polarization. This has the advantage that the zero passage of the current which coincides in an approximately inductive circuit with the voltage peak, can be displaced with regard to the latter. The disconnection is effected depending on the direction of the direct current either before or after the natural zero passage of the current. This is achieved by a rectifier 10 in the circuit of the current transformer 9. Depending on the direction of winding of the auxiliary winding 8″, the low-current interval can be provided before or after the natural zero passage of the current.

Figure 7:
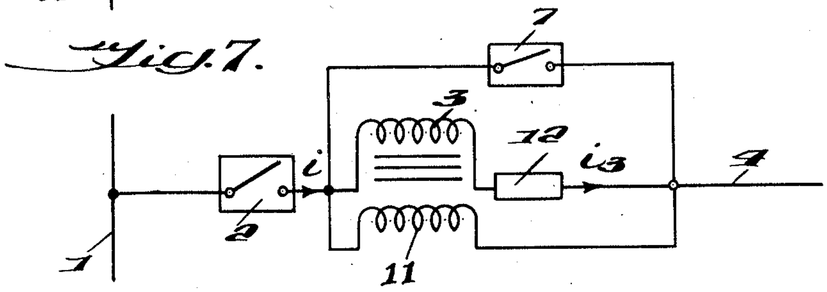

A similar effect can be achieved if, as shown in FIG. 7, additional impedances are connected with the choke coil 3. For example, a resistance 12 can be connected therein in series and an additional choke coil 11 in parallel. The current $i_3$ flows then in the choke coil 3, which is displaced with regard to the total current $i$. This way the low-current interval can be likewise displaced. Preferably the device is bridged by a switch 7 which, in normal operation of the system prevents a voltage drop and loading involved in functioning of the choke coil.

Figure 9:
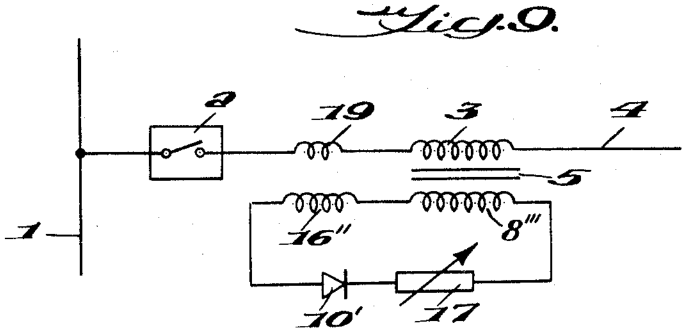

In a further development of the invention, a polarizing choke coil can be connected in series with the choke coil, which has a secondary winding in which can be induced a voltage that is displaced by 90° with regard to the main current and fed to the polarizing coil. FIG. 9 shows an embodiment. From the bus bar 1, represented as a single pole, branches off a fed line 4 which includes a switch 2. Between the switch and the line is connected the choke coil 3 with an auxiliary winding 8‴, which attenuates the short-circuiting current during the zero passage. It has the iron core 5 which is saturated at low current. Connected ahead of this choke coil 3 is a polarizing choke coil 19 with an auxiliary winding 16″, which in the working range of the polarization possesses a linear characteristic. It can be a pure air coil. In order to increase the power delivery, and to reduce the dimensions respectively, it can be equipped however, with an iron core subdivided by air gaps in such a way that the approximately linear characteristic between the current and voltage is maintained in the desired working range. In the auxiliary winding 16″ is produced a voltage displaced by 90° with regard to the primary current. The current generated by this voltage is rectified in the rectifier 10′ and adjusted by the resistance 17 and impressed upon auxiliary winding 8‴. Because of the 90° displacement, the polarization acts just when the main current passes through zero. It has the function of keeping the magnetization of the iron core coil in the same direction during the low-current interval, as it was done by the preceding half wave of the load current.

Figure 10:
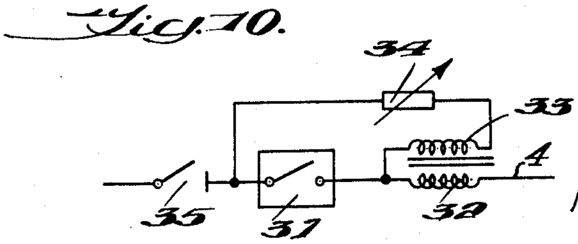

The pre-magnetizing current for the choke coil with the iron core can also be produced by the arc voltage itself. The arc voltage already has the desired phase position for the pre-magnetization and displaces therefore the re-magnetization peaks appearing on the choke coil in the low-current interval. Such an arrangement is illustrated in FIG. 10 wherein the switch for opening the line 4 is shown at 31 and the choke coil with the iron core is indicated at 32. The latter has a secondary winding 33 which is connected via a variable resistance 34 across the terminals of the switch 31. The voltage appearing on these terminals during the disconnection of the switch contacts is the arc voltage across the contacts. In this arrangement a voltage isolating switch 35 is included which, in known manner, after interruption of the main power current by the contacts of the main switch 31, interrupts the residual current which flows through the winding 33 and resistance 34.

Figures 11, 12:
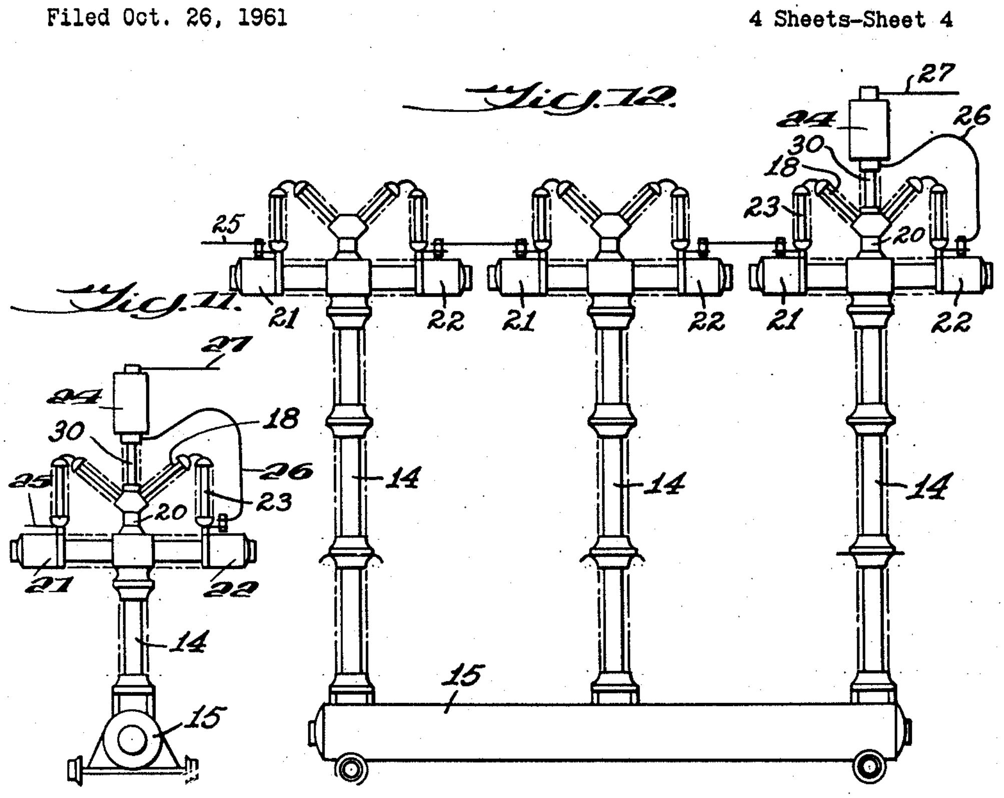
Figure 13:
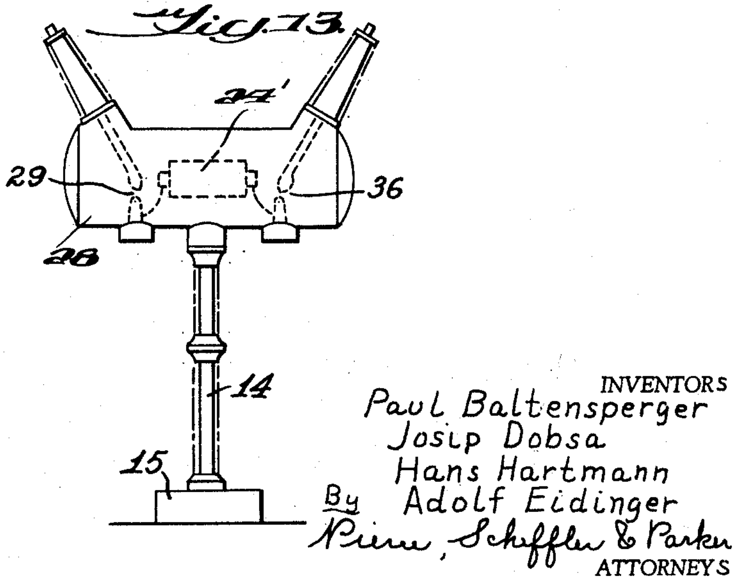

FIGS. 11 to 13 show a few examples for the assembly of the coke oil with the extinction chamber of the switch. FIG. 11 shows a known switch construction of the compressed air type which has the extinction chambers 21 and 22 carried by a support insulator 14 upstanding upon a base 15. Each of the extinction chambers encloses a set of load breaking switch contacts and the two sets of contacts are connected electrically in series in the power line to be interrupted. Arranged parallel to the extinction chambers in known manner are potential control resistances 23 located within auxiliary switch chambers 18 supported in part by a common connection piece 20. The choke coil is located within a hollow insulator indicated at 24 and is supported at the upper end of an intermediate insulator 30 which itself stands upon the connection piece 20. The current path starts from the terminal 25 and continues over the two sets of series connected switch contacts in extinction chambers 21 and 22, the connecting line 26, the choke coil 24, to the other terminal 27. The choke coil is thus in series with the two sets of switch contacts in the extinction chambers. FIG. 12 shows an embodiment wherein three double extinction chamber units of the type illustrated in FIG. 11 are arranged electrically in series on the support base 15 by means of separate insulator columns 14. The incoming terminal 25 at the left of the assembly is arranged for connection to the bus bar 1 shown in the previously described embodiments. The outgoing terminal 27 at the right of the assembly is connected to the overhead transmission line 4. The choke coil is arranged within the insulator 24 and is connected in series with the six sets of load breaking switch contacts located within the three double extinction chambers 21, 22.

FIG. 13 illustrates another specific arrangement for the choke coil where the load switch is of the compressed air type, there being a compressed air vessel 28 in which are located two sets 29, 36 of load breaking contacts electrically connected in series. The vessel 28 is supported atop an insulator column 14 upstanding upon a base 15. Located within the vessel 28 is the choke coil 24′ which is connected intermediate the load contact sets 29 and 36.

We claim:

1. In an arrangement for reducing the adverse effect of short-circuit currents on an electrical switch connected in series with an electrical network, and particularly a network having an overhead transmission line, for interrupting the line, the improvement wherein a saturable choke having an iron core is connected in series with the overhead line in the vicinity of said electrical switch, said choke being saturated at current values of about one-hundredth of the rated current of said switch, and the inductance of said choke when in an unsaturated state being not greater than the inductance of a section of said overhead line ten kilometers in length.

2. An arrangement as defined in claim 1 wherein said choke includes an auxiliary winding for biasing its iron core, said auxiliary winding being supplied with current from the secondary of a current transformer having its primary connected in series with said choke.

3. An arrangement as defined in claim 2 and which further includes a rectifier in the circuit between said secondary and said auxiliary winding.

4. An arrangement as defined in claim 1 wherein said choke includes a pair of coils connected in parallel and there being a resistance element connected in series with only one of said coils.

5. An arrangement as defined in claim 1 and which further includes a condenser connected in parallel with said choke such that the characteristic frequency determined by the choke and condenser is lower than the remainder of the circuit.

6. An arrangement as defined in claim 1 wherein the winding of said choke is constituted by a straight conductor section and around which said iron core is placed.

7. An arrangement as defined in claim 6 wherein said straight conductor section is constituted by a current carrying terminal part of said switch.

8. An arrangement as defined in claim 1 wherein two of said saturable chokes are connected in series with said overhead transmission line, said chokes being located respectively on opposite sides of said switch.

9. An arrangement as defined in claim 1 wherein said choke includes an auxiliary winding for biasing its iron core and which further includes a second choke without an iron core connected in series between said iron core choke and said switch, said second choke also including an inductively coupled auxiliary winding which is connected to said auxiliary winding on said iron core choke by way of a rectifier and a resistance element.

10. An arrangement as defined in claim 1 wherein said choke includes an auxiliary winding for biasing its iron core connected in parallel with the contacts of said switch, there being a resistance element included in the connections in series with said auxiliary winding.

11. An arrangement as defined in claim 1 wherein said switch is constituted by two sets of series connected switch contacts located in separate insulator housings and said choke is located within another insulator housing arranged between said switch contact housings.

12. An arrangement as defined in claim 1 wherein said switch includes a pressure gas vessel within which are located two sets of series connected switch contacts, and said choke is also located within said pressure gas vessel between said sets of switch contacts and constitutes part of the electrical connections therebetween.

References Cited in the file of this patent

UNITED STATES PATENTS

| | | |
|---|---|---|
| 816,468 | Hewlett | Mar. 27, 1906 |
| 2,141,921 | Leukert | Dec. 27, 1938 |
| 2,975,355 | Dortort | Mar. 14, 1961 |